US010415608B2

(12) United States Patent
Van Gemert

(10) Patent No.: US 10,415,608 B2
(45) Date of Patent: Sep. 17, 2019

(54) HYDRAULIC CYLINDER COVER

(71) Applicant: Caterpillar Work Tools B.V., s'Hertogenbosch (NL)

(72) Inventor: Johannes Lambert Leonardus Van Gemert, Mill (NL)

(73) Assignee: Caterpillar Work Tools B.V., s-Hertogenbosch (NL)

( * ) Notice: Subject to any disclaimer, the term of this patent is extended or adjusted under 35 U.S.C. 154(b) by 343 days.

(21) Appl. No.: 15/300,604

(22) PCT Filed: Mar. 31, 2015

(86) PCT No.: PCT/EP2015/057075
§ 371 (c)(1),
(2) Date: Sep. 29, 2016

(87) PCT Pub. No.: WO2015/158546
PCT Pub. Date: Oct. 22, 2015

(65) Prior Publication Data

US 2017/0108017 A1 Apr. 20, 2017

(30) Foreign Application Priority Data

Apr. 18, 2014 (EP) .................................... 14165300

(51) Int. Cl.
*F15B 15/14* (2006.01)
*E02F 9/22* (2006.01)
(Continued)

(52) U.S. Cl.
CPC .......... *F15B 15/1457* (2013.01); *E02F 3/965* (2013.01); *E02F 9/2271* (2013.01);
(Continued)

(58) Field of Classification Search
CPC . E02F 9/2271; E02F 3/404; E02F 9/24; F15B 15/1423; F15B 2211/865; F15B 2211/8606; F15B 15/1457; F15B 15/1471
(Continued)

(56) References Cited

U.S. PATENT DOCUMENTS 3,997,986 A * 12/1976 Black .................... E02F 3/6454 37/419
4,936,193 A * 6/1990 Stoll .................. B23Q 11/0825 220/8
(Continued)

FOREIGN PATENT DOCUMENTS

CN 1777757 5/2006
CN 102367820 3/2012
(Continued)

OTHER PUBLICATIONS

International Search Report dated Jun. 30, 2015, issued in PCT/EP2015/057075 (2 pages).
(Continued)

*Primary Examiner* — Thomas E Lazo
*Assistant Examiner* — Dustin T Nguyen

(57) ABSTRACT

A hydraulic cylinder cover is disclosed. The hydraulic cylinder cover may have a body having a first end and a second end. The hydraulic cylinder cover may also have a flange positioned at the first end. In addition, the hydraulic cylinder cover may have a cover eye provided on the flange. The cover eye may be configured to connect to a piston rod eye of a hydraulic cylinder.

20 Claims, 3 Drawing Sheets

(51) Int. Cl.
*E02F 3/96* (2006.01)
*E04G 23/08* (2006.01)

(52) U.S. Cl.
CPC ........ *E04G 23/082* (2013.01); *F15B 15/1423* (2013.01); *F15B 2211/865* (2013.01); *F15B 2211/8606* (2013.01)

(58) Field of Classification Search
USPC ........................................ 92/53, 51; 172/813
See application file for complete search history.

(56) References Cited

U.S. PATENT DOCUMENTS

| | | | | |
|---|---|---|---|---|
| 5,074,390 | A * | 12/1991 | Fuhrmann | B05C 21/005 188/322.12 |
| 5,152,351 | A * | 10/1992 | Rieger | E02F 9/2271 172/508 |
| 5,292,079 | A * | 3/1994 | Zakohji | E02F 3/965 241/264 |
| 5,386,652 | A * | 2/1995 | Ramun | B23D 17/00 37/406 |
| 6,843,005 | B2 * | 1/2005 | Clapper | E02F 3/404 37/406 |
| 7,392,736 | B2 * | 7/2008 | Fenn | F16F 9/54 188/322.12 |
| 7,681,657 | B2 * | 3/2010 | Giesmann | A01B 59/068 172/813 |
| 7,958,980 | B2 * | 6/2011 | Seino | E02F 9/2271 188/322.12 |
| 8,292,000 | B2 * | 10/2012 | Takami | E02F 3/7627 172/813 |
| 8,939,700 | B2 * | 1/2015 | Cate | E02F 3/34 172/508 |
| 2002/0053150 | A1 * | 5/2002 | Burton | E02F 3/34 37/406 |
| 2004/0093770 | A1 | 5/2004 | Clapper | |
| 2016/0208827 | A1 * | 7/2016 | Nishio | E02F 9/24 |

FOREIGN PATENT DOCUMENTS

| | | | |
|---|---|---|---|
| DE | 10043647 | | 3/2002 |
| EP | 0450156 | A1 | 10/1991 |
| JP | 04222725 | | 8/1992 |
| JP | 07310707 | | 11/1995 |
| JP | 2007-169970 | A | 7/2007 |
| WO | WO 2014/035300 | A1 | 3/2014 |

OTHER PUBLICATIONS

EP Search Report dated Jul. 22, 2014, issued in EP 14165300.6 (2 pages).

* cited by examiner

HYDRAULIC CYLINDER COVER

CLAIM FOR PRIORITY

This application is a U.S. National Phase entry under 35 U.S.C. § 371 from PCT International Application No. PCT/EP2015/057075, filed Mar. 31, 2015, which claims benefit of priority of European Patent Application No. 14165300.6 filed Apr. 18, 2014, all of which are incorporated herein by reference.

TECHNICAL FIELD

This disclosure relates to the field of hydraulic cylinders and in particular to hydraulic cylinders used in construction and/or demolition tools.

BACKGROUND

Hydraulic cylinders may be used in construction equipment, manufacturing machinery, and civil engineering. Hydraulic cylinders may provide unidirectional force through a unidirectional stroke.

Hydraulic cylinders may have a piston rod that may be formed of a hard cold-rolled steel. The piston rod may be attached to a piston and may extend from the cylinder barrel through the rod-end head. The piston rod may connect the hydraulic actuator to the machine tool for performing work. The piston rod may have piston rod eyes for connection to the machine tool.

During work the piston rod may be extended form the cylinder barrel and may be exposed to falling work material such as debris. In particular, during demolition work the falling debris may damage the extended piston rod. Hydraulic cylinder covers may be provided to protect extended piston rods from such damage. The hydraulic cylinder covers may be slidingly mounted onto the cylinder barrel and coupled to the piston rod eye. As the piston rod extends from the cylinder barrel the hydraulic cylinder cover moves along the cylinder barrel correspondingly. The hydraulic cylinder cover may extend over the length of the exposed piston rod.

The present disclosure is directed, at least in part, to improving or overcoming one or more aspects of the prior art system.

BRIEF SUMMARY OF THE INVENTION

In a first aspect, the present disclosure describes a hydraulic cylinder cover for a hydraulic cylinder of machine tool, the hydraulic cylinder cover comprising: a body having a first end and a second end, a flange coupled to the first end, and a cover eye provided on the flange for connection to a piston rod eye of the hydraulic cylinder.

BRIEF DESCRIPTION OF THE DRAWINGS

The foregoing and other features and advantages of the present disclosure will be more fully understood from the following description of various embodiments, when read together with the accompanying drawings, in which.

DETAILED DESCRIPTION

Figure 1:
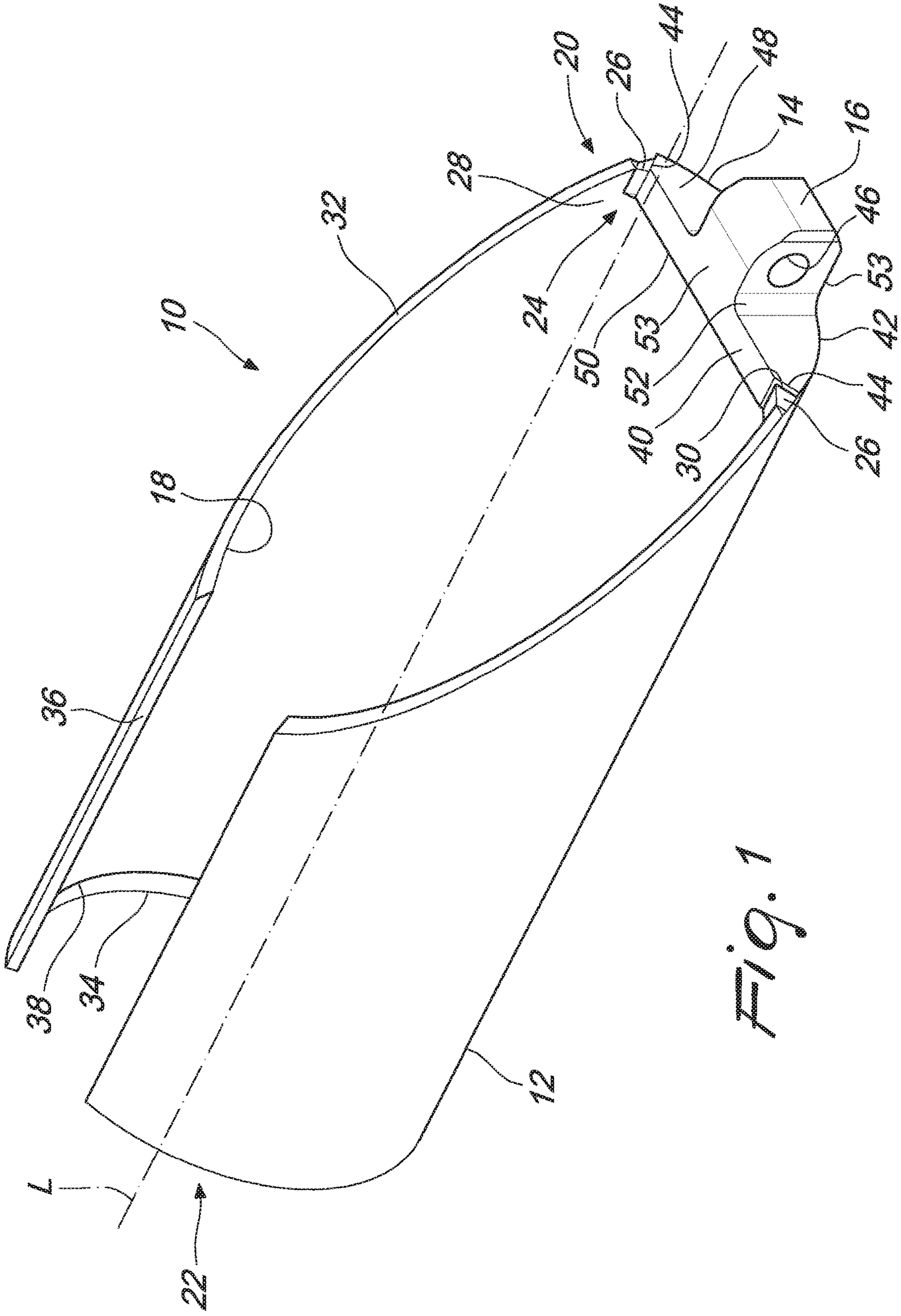
FIG. 1 is an isometric view of a hydraulic cylinder cover according to the present disclosure.

This disclosure generally relates to a hydraulic cylinder cover 10 for assembly onto a hydraulic cylinder provided in a machine tool. FIG. 1 illustrates a hydraulic cylinder cover 10. The hydraulic cylinder cover 10 may comprise a body 12, a flange 14 and a cover eye 16.

The body 12 may be provided in a form of tube. Body 12 may be extended along a longitudinal axis L. Body 12 may have a lumen 18. The lumen 18 may be configured to accommodate a cylinder barrel of a hydraulic cylinder (not shown). Body 12 may slidably accommodate the cylinder barrel of the hydraulic cylinder. Body 12 has an inner surface 28. In an embodiment, the inner surface 28 may be curved. A portion of the inner surface 28 may slidably contact cylinder barrel.

Body 12 has a first end 20 and a second end 22. The flange 14 may be coupled to the first end 20 of the body 12. The flange 14 may be welded to the body 12 at the first end 20. Flange 14 may be coupled at a tip of the first end 20.

First end 20 may have a coupling portion 24. The coupling portion 24 may be configured to receive the flange 14. Coupling portion 24 may be provided on the curved inner surface 28 of the body 12. Coupling portion 24 may be formed on the tip of the first end 20. Coupling portion 24 may be substantially transverse to the longitudinal axis L.

In an embodiment, coupling portion 24 may comprise a pair of brackets. Brackets may extend from the inner surface 28 into the lumen 18. Each bracket may have a bracket abutment surface that abuts a portion of the flange 14. Flange 14 may be coupled to the body 12 at the curved inner surface 28 and the brackets.

Body 12 may further comprise a slant opening 32. Slant opening 32 may originate from the coupling portion 24 and extend into the body 12. The piston rod of a hydraulic cylinder (not shown) may extend through the slant opening 32. Slant opening 32 may be inclined relative to the longitudinal axis L. An end of lumen 18 may be accessible through the slant opening 32.

Body 12 may have an aperture 34 at the second end 22. The aperture 34 may have a diameter that is equal to the diameter of the lumen 18. The aperture 34 may slidably accommodate the cylinder barrel. The plane of the aperture 34 may be transverse to the longitudinal axis L. An end of lumen 18 may be accessible through the aperture 34. The end accessible through the aperture 34 may be opposite to the end accessible through the slant opening 32.

Body 12 may have a longitudinal opening 36. Longitudinal opening 36 may extend from the second end 22. Longitudinal opening 36 may extend between the aperture 34 and the slant opening 32. The longitudinal opening 36 may bound the slant opening 32 at an end and the opposite end may be bound by the coupling portion 24. Longitudinal opening 36 may be positioned on the body 12 opposite to the coupling portion 24. Longitudinal opening 36 may be parallel to the longitudinal axis L. The side of the lumen 18 may be accessible through the longitudinal opening 36.

Body 12 may further comprise at least one guide 38. Guide 38 may contact the cylinder barrel. Guide 38 may be located adjacent the aperture 34. Guide 38 may be positioned on the inner surface 28. Guide 38 may extend into the lumen 18.

Flange 14 may be formed as a plate with two sides. The lumen side 50 may face the lumen 18 and the opposite cover eye side 48 may support the cover eye 16. Flange 14 may have two edges that surround the two sides. Flange 14 may have a linear edge 40 and an arcuate edge 42. The linear edge 40 may be opposite to the arcuate edge 42. The linear edge 40 and the arcuate edge 42 may both be substantially transverse to the longitudinal axis L.

The arcuate edge 42 may be configured so as to fit on the body 12. The arcuate edge 42 may be shaped to fit on the inner surface 28 of the body 12. Linear edge 40 may be a free edge.

The flange 14 may further comprise a pair of bevelled portions 44. Bevelled portions 44 may be positioned at opposite ends of the flange 14. Each bevelled portion 44 may be positioned between the linear edge 40 and the arcuate edge 42. The bevelled portions 44 may be inclined relative to the linear edge 40 and the arcuate edge 42.

In an embodiment, the flange 14 may not be provided with the bevelled portions 44. The liner edge 40 may connect directly with the arcuate edge 42. The flange 14 may be coupled to the body 12 at the arcuate edge 42.

Cover eye 16 may be positioned on the cover eye side 48 of the flange 14. Cover eye 16 may extend from the flange 14 in a direction away from the lumen 18 of the body 12. Cover eye 16 may extend in a direction substantially parallel to the longitudinal axis L. Cover eye 16 may be positioned between the linear edge 40 and the arcuate edge 42. Cover eye 16 may have opposite edges 53 that are respectively planar to the linear edge 40 and the arcuate edge 42. Cover eye 16 may not be directly coupled to the body 12.

Cover eye 16 may have a pin hole 46. Pin hole 46 may be substantially parallel to the flange 14. Pin hole 46 may be substantially parallel to the eye side 48. Pin hole 46 may be substantially transverse to the longitudinal axis L. Pin hole 46 may extend through the cover eye 16 and may have openings on opposite sides of the cover eye 16. Grooves 52 may join the sides with openings of the pin hole 46 to the cover eye side 48.

The body 12, flange 14 and the cover eye 16 may be formed as a single monolithic structure. In an embodiment, the cover eye 16 and the flange 14 may be casted as a single monolithic structure and coupled to the body 12. The flange 14 may be welded to the body 12. Welds 26 may be made at the bevelled portions 44. Flange 14 may be held between the welded surfaces 30 and the inner surface 28 at the coupling portion 24. In an alternate embodiment, lumen side 50 may be welded onto the inner surface 28. In yet a further embodiment, the cover eye 16 may be machined with the flange 14.

Figure 2:
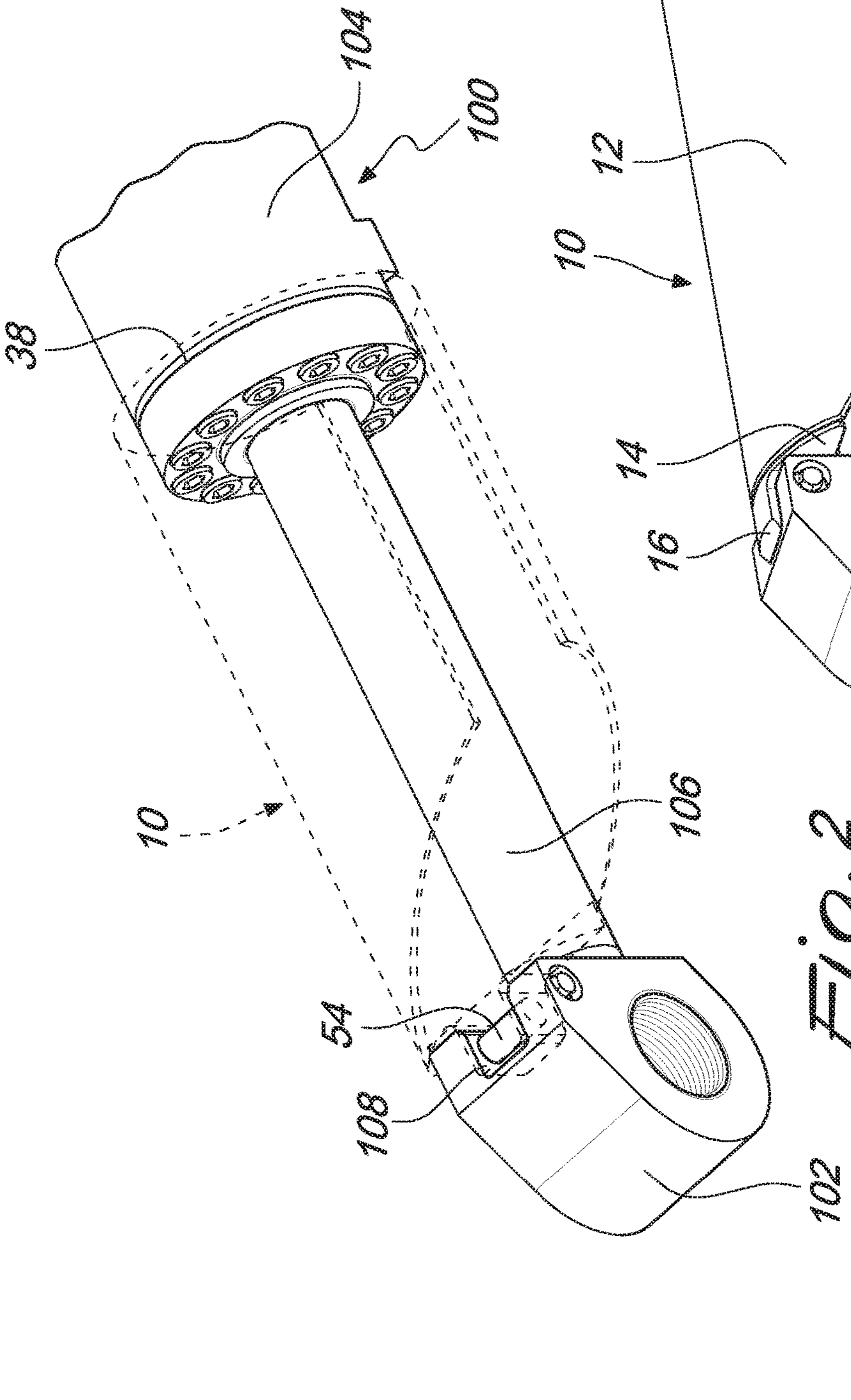
FIG. 2 is an isometric view of the hydraulic cylinder cover of FIG. 1 rendered in outline and positioned on a hydraulic cylinder with the piston rod extended.

FIG. 2 illustrates a hydraulic cylinder 100 provided with the hydraulic cylinder cover 10. The first end 20 of the hydraulic cylinder cover 10 may be positioned at the piston rod eye 102. The second end 22 may be positioned on the cylinder barrel 104. Guide 38 at the second end 22 may engage the cylinder barrel 104.

The cover eye 16 may fit into the clevis 108 provided on the piston rod eye 102. The cover eye 16 may be coupled to the piston rod eye 102 through a pin 54. The coupling of the cover eye 16 to the piston rod eye 102 may enable relative rotational movement and the axial movement of the piston rod 106 may effect a corresponding axial movement of the hydraulic cylinder cover 10. With the coupling of the cover eye 16 to the piston rod eye 102 the piston rod 106 may be spaced from the liner edge 40 of the flange 14. The piston rod eye 102 may not contact the flange 14.

The aperture 34 at the second end 22 of the hydraulic cylinder cover 10 may enable transit of the cylinder barrel 104 through the body 12 and into the lumen 18. The piston rod 106 may extend from the cylinder barrel 104 and through the lumen 18 of the body 12. The extended piston rod 106 may be protected by the hydraulic cylinder cover 10.

Figure 3:
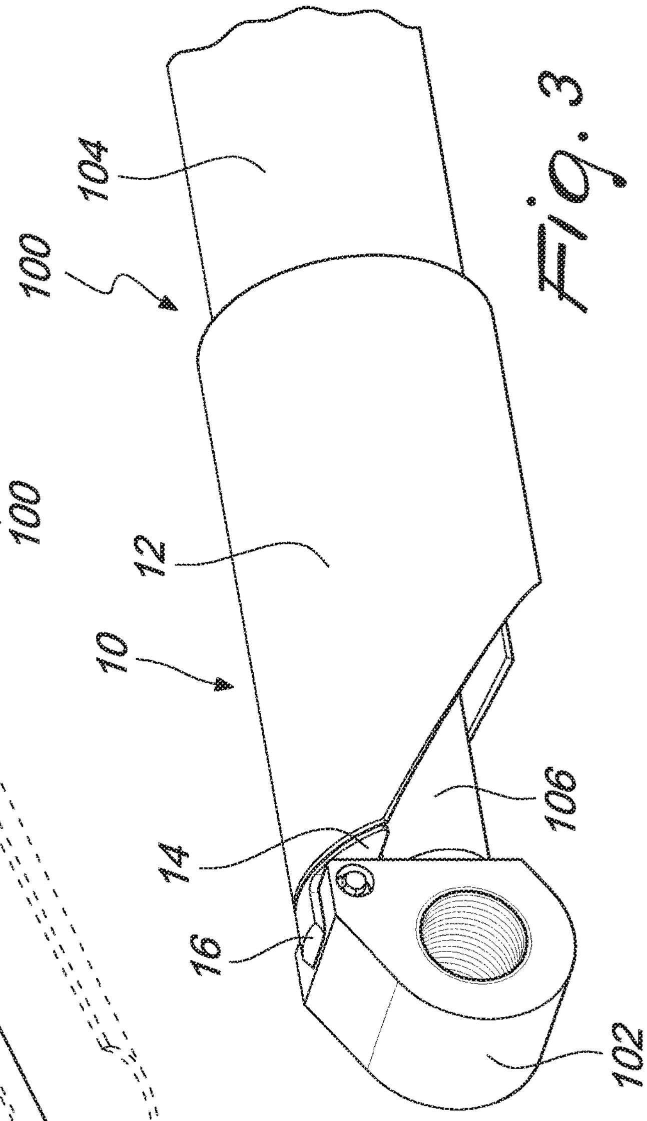
FIG. 3 is an isometric view of the hydraulic cylinder cover of FIG. 1 positioned on a hydraulic cylinder with the piston rod extended.

With reference to FIG. 3, the hydraulic cylinder cover 10 may be positioned on the hydraulic cylinder 100. The extension and retraction of the piston rod 106 may effect a corresponding movement of the hydraulic cylinder cover 10. With the piston rod 106 retracted into the cylinder barrel 104 the hydraulic cylinder cover 10 may be positioned over the cylinder barrel 104. With the piston rod 106 extracted from the cylinder barrel 104 the hydraulic cylinder cover 10 may be moved from the cylinder barrel 104 and positioned over the piston rod 106.

Figure 4:
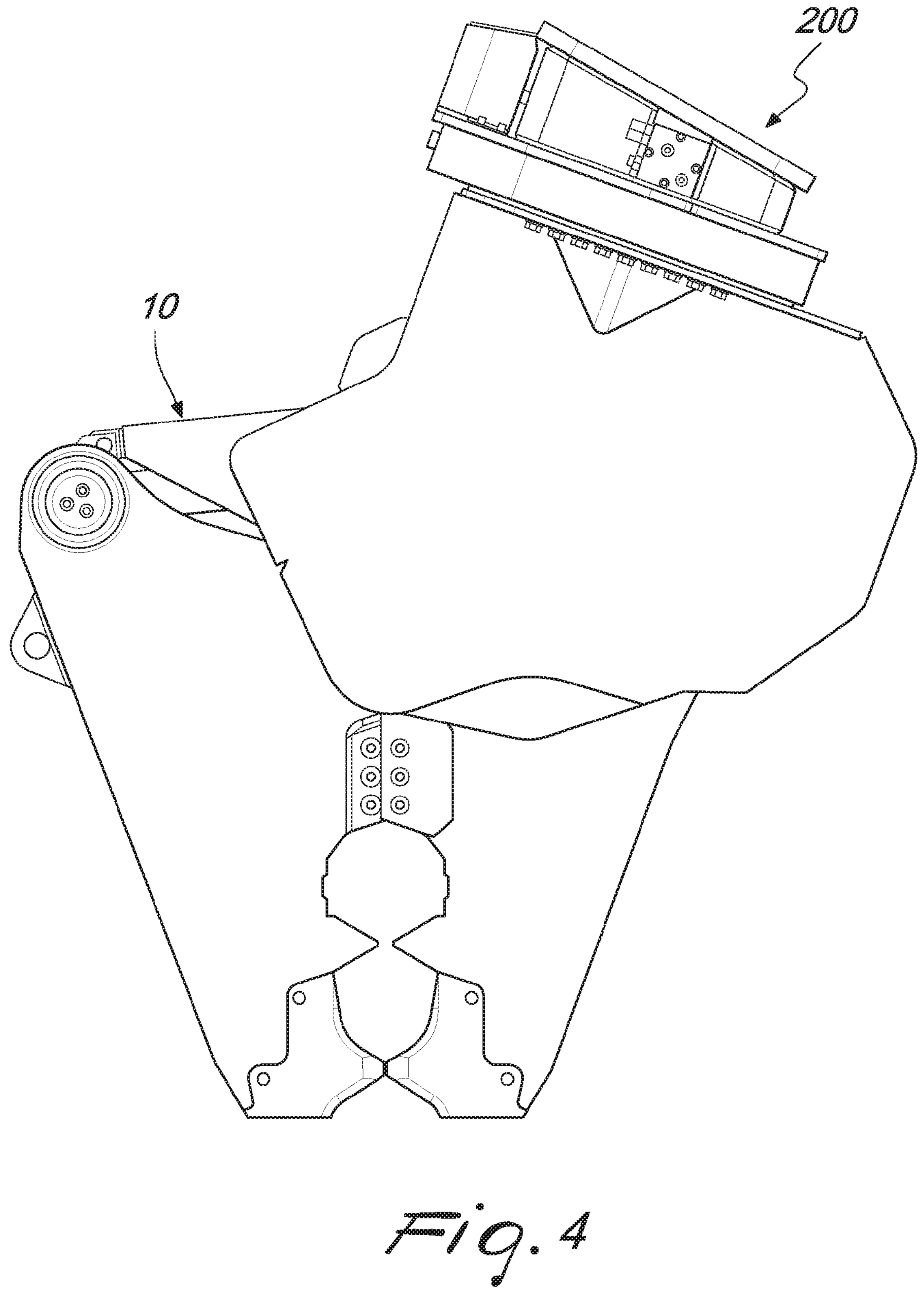
FIG. 4 is an isometric view of the hydraulic cylinder cover of FIG. 1 installed on a shear jaw that is closed.

With reference to FIG. 4, the hydraulic cylinder 100 with the hydraulic cylinder cover 10 are mounted on a machine tool, in particular a shear jaw set 200. With the jaw set moving from an open to a closed position the piston rod 106 may be extracted and may be exposed to damage from debris. The hydraulic cylinder 10 may protect the piston rod 106 during the demolition work.

The skilled person would appreciate that foregoing embodiments may be modified or combined to obtain the hydraulic cylinder cover 10 of the present disclosure.

INDUSTRIAL APPLICABILITY

This disclosure describes a hydraulic cylinder cover 10 that provides protection for a piston rod of a hydraulic cylinder during work operation. The hydraulic cylinder cover 10 may have the cover eye 16 provided on the flange 14. The flange 14 may be coupled to the body 12 of the hydraulic cylinder cover 10. The hydraulic cylinder cover 10 may be connected to the hydraulic cylinder through the cover eye 16.

Forces generated during work operations such as demolition work may be transmitted through the piston rod eye 102 to the cover eye 16. The forces may be dissipated through the flange 14. Particularly, high forces may be generated during shearing operations. These high forces may not cause stress failures between the cover eye 16 and the flange 14 as the forces are dissipated around the cover eye 16 through the flange 14.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

Where technical features mentioned in any claim are followed by reference signs, the reference signs have been included for the sole purpose of increasing the intelligibility of the claims and accordingly, neither the reference signs nor their absence have any limiting effect on the technical features as described above or on the scope of any claim elements.

One skilled in the art will realise the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

The disclosures in European Patent Application No. 14165300.6 from which this application claims priority are incorporated herein by reference.

The invention claimed is:

1. A hydraulic cylinder cover for covering a piston rod extending from a cylinder barrel of a hydraulic cylinder of a machine tool, comprising:

a body having a first end and a second end, wherein the second end can be positioned on and slidable on the cylinder barrel of the hydraulic cylinder, a flange positioned at the first end, and a cover eye provided on the flange, the cover eye being pivotally connected to a piston rod eye of the hydraulic cylinder to allow rotation of the hydraulic cylinder cover relative to the piston rod eye and the piston rod about the connection between the cover eye and the piston rod eye when the second end is not positioned on the cylinder barrel, and wherein, when the second end is positioned on the cylinder barrel, the body surrounds and engages the cylinder barrel to prevent the hydraulic cylinder cover from rotating relative to the piston rod eye and the piston rod about the connection between the cover eye and the piston rod eye.

2. The hydraulic cylinder cover of claim 1, wherein the body is formed as a tube with a lumen configured to accommodate the cylinder barrel of the hydraulic cylinder.

3. The hydraulic cylinder cover of claim 1, further comprising a longitudinal opening extending from the second end towards the first end, wherein the longitudinal opening has an opening width perpendicular to a longitudinal axis of the hydraulic cylinder cover that is less than a barrel outer diameter of the cylinder barrel.

4. The hydraulic cylinder cover of claim 1, wherein the body comprises a coupling portion positioned at the first end and configured to receive the flange.

5. The hydraulic cylinder cover of claim 4, wherein the body is provided with a slant opening extending from the coupling portion at the first end towards the second end, the slant opening being inclined relative to a longitudinal axis of the hydraulic cylinder cover.

6. The hydraulic cylinder cover of claim 1, wherein the flange has an arcuate edge configured to be positioned on an inner surface of the body.

7. The hydraulic cylinder cover of claim 6, wherein the flange has a linear edge opposite the arcuate edge.

8. The hydraulic cylinder cover of claim 7, wherein the cover eye is positioned between the linear edge and the arcuate edge.

9. The hydraulic cylinder cover of claim 1, wherein the cover eye and the flange are cast as a single monolithic structure coupled to the body.

10. The hydraulic cylinder cover of claim 1, wherein the cover eye extends from the flange in a direction away from the body.

11. A hydraulic cylinder, comprising:

a cylinder barrel;

a piston rod extending from the cylinder barrel;

a piston rod eye mounted on an end of the piston rod opposite the cylinder barrel; and a hydraulic cylinder cover, including:

a body having a first end and a second end, wherein the second end can be positioned on and slidable on the cylinder barrel of the hydraulic cylinder;

a flange positioned at the first end; and a cover eye provided on the flange, the cover eye being pivotally connected to the piston rod eye to allow rotation of the hydraulic cylinder cover relative to the piston rod eye and the piston rod about the connection between the cover eye and the piston rod eye when the second end is not positioned on the cylinder barrel, and wherein, when the second end is positioned on the cylinder barrel, the body surrounds and engages the cylinder barrel to prevent the hydraulic cylinder cover from rotating relative to the piston rod eye and the piston rod about the connection between the cover eye and the piston rod eye.

12. The hydraulic cylinder of claim 11, wherein the body includes a tube configured to receive the cylinder barrel.

13. The hydraulic cylinder of claim 11, further including a longitudinal opening extending from the second end towards the first end, wherein the longitudinal opening has an opening width perpendicular to a longitudinal axis of the hydraulic cylinder cover that is less than a barrel outer diameter of the cylinder barrel.

14. The hydraulic cylinder of claim 11, wherein the body includes a slant opening extending from the first end towards the second end, the slant opening being inclined relative to a longitudinal axis of the hydraulic cylinder cover.

15. The hydraulic cylinder of claim 11, wherein the flange includes an arcuate edge configured to be positioned on an inner surface of the body.

16. The hydraulic cylinder of claim 15 wherein the flange includes a linear edge opposite the arcuate edge.

17. The hydraulic cylinder of claim 16, wherein the cover eye is positioned between the linear edge and the arcuate edge.

18. The hydraulic cylinder of claim 11, wherein the cover eye and the flange are formed as a single monolithic structure coupled to the body.

19. The hydraulic cylinder of claim 18, wherein the cover eye extends from the flange in a direction away from the body.

20. The hydraulic cylinder of claim 11, wherein the piston rod eye is configured to receive the cover eye, and the hydraulic cylinder comprises a pin rotatably coupling the piston rod eye and the cover eye.

* * * * *